United States Patent [19]

Zorn

[11] 3,727,037

[45] Apr. 10, 1973

[54] VARIABLE INCREMENT DIGITAL FUNCTION GENERATOR

[76] Inventor: Alan H. Zorn, 1938 Moreland Road, Abington, Pa. 19001

[22] Filed: Aug. 27, 1971

[21] Appl. No.: 175,623

[52] U.S. Cl..........235/150.53, 235/197, 340/347 AD

[51] Int. Cl................................G06f 7/38, G06j 1/00

[58] Field of Search.........................235/150.53, 197, 235/186, 189, 152; 328/14, 142; 340/347 AD

[56] References Cited

UNITED STATES PATENTS

| | | | |
|---|---|---|---|
| 2,886,243 | 5/1959 | Sprague et al. | 235/150.53 |
| 3,512,151 | 5/1970 | Finkel et al. | 235/150.53 X |
| 3,250,905 | 5/1966 | Schroeder et al. | 235/150.53 X |
| 3,345,505 | 10/1967 | Schmid | 235/197 |
| 3,509,556 | 4/1970 | Schmidt | 235/150.53 X |
| 3,513,301 | 5/1970 | Howe | 235/150.53 |

*Primary Examiner*—Joseph F. Ruggiero
*Attorney*—R. S. Sciascia et al.

[57] ABSTRACT

A digital sine function generator having a read-only-memory for storing increments of a sine function thereon, where the storage size of the read-only-memory is limited such that the total number of memory bits as well as the number of bits at each address is less than that required to register all of the sine function increments. Accordingly the function is coded into the memory ambiguously where in the steep or high slope region of the sine function, identical code is used to indicate large increments corresponding to small increments in the relatively level region of the function. An interval detector determines the region of the function which is being read out of the memory and corrects or weights the code at the corresponding locations thus correcting for the ambiguity.

6 Claims, 3 Drawing Figures

INVENTOR.
ALAN H. ZORN
BY
ATTORNEY

INVENTOR.
ALAN H. ZORN
BY
ATTORNEY

VARIABLE INCREMENT DIGITAL FUNCTION GENERATOR

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

The present invention relates to electronic function generators, and more particularly to digital function generators for reproducing smooth or continuous functions.

The necessity for mathematical modeling of functions of an input signal for simulation or display occurs frequently in the computer art. Modeling of functions and in particular modeling of non-linear functions, such as trigonometric or exponential functions, does not conveniently lend itself to direct arithmetic solutions and function generators are frequently employed for this purpose. Such function generators are typically constructed to receive the input signal and to directly convert the input signal to an output signal corresponding to a given function. This conversion is made either by direct look-up, as in the case of digital or discrete function generators, or by non linear gain shaping in the case of analog or continuous function generators. The use of digital function generators with their associated speed, adaptability to a broad range of environments, compactness and reliability is particularly favored in field operations, such as for example coordinate transformations in aircraft fire control computers. When, however, a high degree of accuracy is desired function generators of the digital type, i.e., where the input signal determines the address of a stored output signal which is being looked up, often reach physical limits in the size of the look-up memory containing the output signals. Typically the memory size is directly related to the desired accuracy and resolutions of the function which can be directly converted to the product of the number of addresses or locations at which the function is reproduced times the number of increments available at each address, or for example in terms of binary switches the number of switches necessary to form the address logic times the number of switches available at each address to define the increment thereat. To obviate the need of storing at each address the full increment corresponding to the function output signal at a particular input signal counting techniques have been commonly utilized wherein each address contains only a signal corresponding to the incremental difference of the function signal and the incremental differences are serially accumulated. In this form the range of possible slopes of the function signal determines the number of discrete increments required at each address. For functions which are continuous and at the same time comprise a large range of slopes the aforementioned counting technique, although providing an improvement over the previous direct reading technique, is still critical in terms of required elements in the memory necessary to accommodate the complete distribution of possible increments at each address. Consequently in the prior art extensive efforts have been directed at optimizing the size of the memory and the address and output logic thereof.

SUMMARY OF THE INVENTION

Accordingly, it is the general purpose and object of the present invention to provide a logical apparatus which, for selected intervals of input signal, will assign different weights to increment signals at corresponding address locations in the memory, the weighting being determined by the slope of the function over that interval. Other objects of the invention are to provide an increase in accuracy for a given function generator with minimal additional components and power requirements.

Briefly these and other objects are accomplished within the present invention by providing an interval detector formed to receive the output signal of a fixed increment counter, which at a predetermined level of the fixed counter output signal switches weighting coefficients on corresponding increments stored in a memory. Accordingly the same signal combinations from the memory can be used to describe different slopes of the function, reducing the required word length contained at each address. The interval detector, therefore, forms a logical step in the use of short wordlength memory, allowing for conservation of memory hardware. More specifically, the fixed increment counter is driven by a clock, cyclically producing a serially increasing output signal of equal increments. The serially produced fixed increment output signal is connected to a read-only-memory unit which, at addresses corresponding to the fixed increment output signal, has preselected programmable signals stored therein corresponding to a modified function to be generated. The signals stored in the memory are read out to a logic unit which concurrently receives a weighting signal from the interval detector corresponding to preselected points on the fixed increment output signal. The logic unit selectively weights and corrects the memory output signal containing the modified function, producing an output signal corresponding to the increments of the corrected function. The logic output signal is accumulated in a variable increment counter and the accumulated signal is fed to a buffer. The buffer receives also an output signal from a comparator which compares the fixed increment output signal with the input signal and upon finding a match enables the buffer to read out.

DESCRIPTION OF THE PREFERRED EMBODIMENT

For purposes of clarity the following description refers to a sine function generator receiving an angular or shaft position signal at the input thereof. It is to be understood that other continuous functions of an input signal, not necessarily trigonometric, are within the scope of the disclosure.

Figure 1:
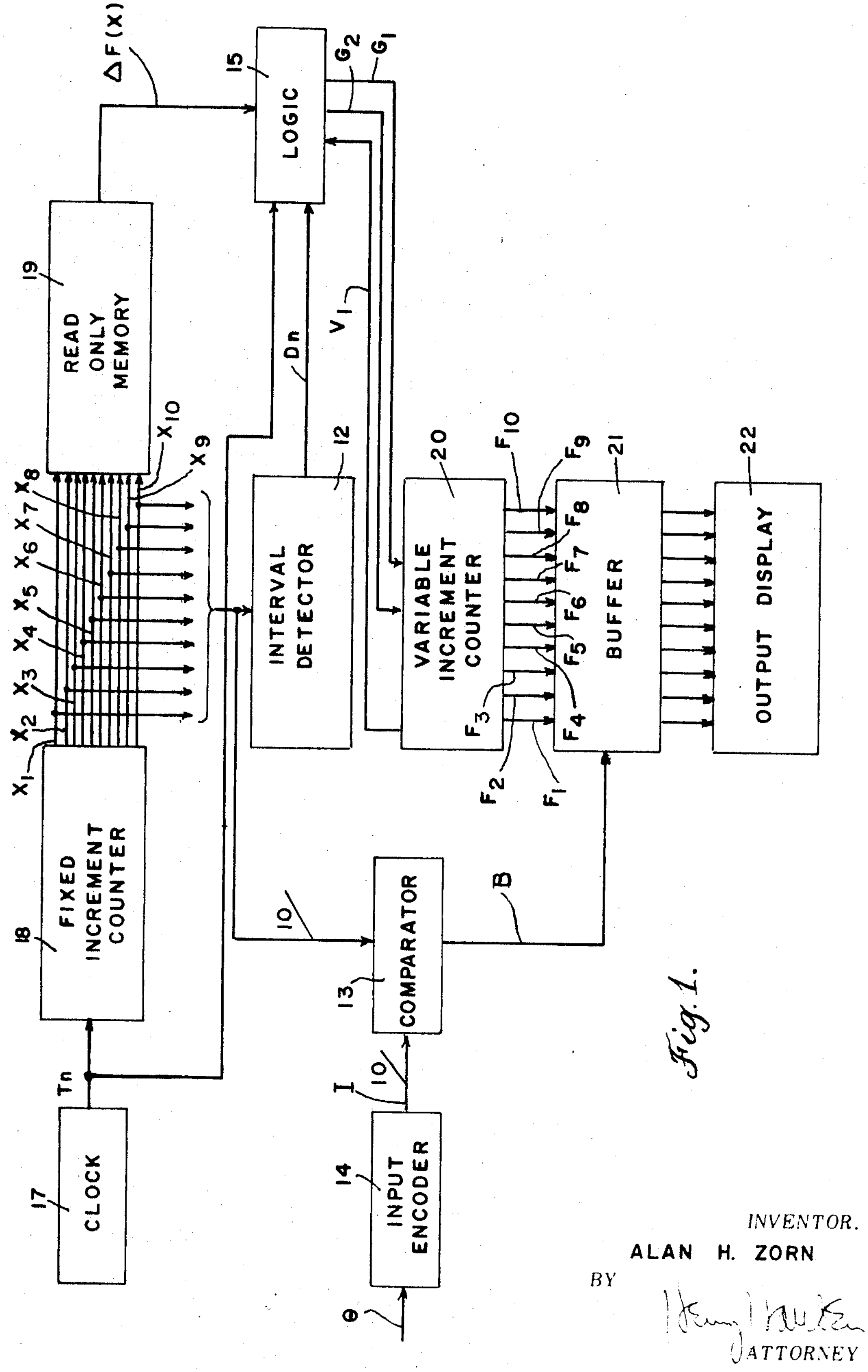
FIG. 1 illustrates in block diagram form one embodiment of a digital function generator constructed according to the present invention.

As shown in FIG. 1, an angular signal $\theta$ is received by an input encoder 14 which by means well known in the art converts the angular signal $\theta$ to a 10 bit binary signal I at the output thereof. A fixed increment counter 18, of a type generally known as a ripple counter in the art, receives a timing signal $T_n$ from a clock 17 at the input side thereof and provides at the output side thereof a cyclical, sequentially increasing, 10 bit binary signal of equal increments. The 10 bit binary signal from counter 18 is carried on 10 parallel connections $X_1$ thru $X_{10}$, inclusive, corresponding to the most significant to least significant bit arrangement in binary code commonly practiced in the art. Specifically, this arrangement corresponds to a 10th power binary code allowing for 1,024 equal increments within each complete cycle of counter 18 where a cycle constitutes a sequence of 10 bit words serially rippled through and incremented as follows:

| | $X_1$ | $X_2$ | $X_3$ | $X_4$ | $X_5$ | $X_6$ | $X_7$ | $X_8$ | $X_9$ | $X_{10}$ |
|---|---|---|---|---|---|---|---|---|---|---|
| (0) | 0 | 0 | 0 | 0 | 0 | 0 | 0 | 0 | 0 | 0 |
| (1) | 0 | 0 | 0 | 0 | 0 | 0 | 0 | 0 | 0 | 1 |
| (2) | 0 | 0 | 0 | 0 | 0 | 0 | 0 | 0 | 1 | 0 |
| .... | .. | .. | .. | .. | .. | .. | .. | .. | .. | .. |
| (1023) | 1 | 1 | 1 | 1 | 1 | 1 | 1 | 1 | 1 | 1 |

Similarly the 10 bit binary signal I from encoder 14 translates the input signal $\theta$ into 1,024 equal increments. Thus, for example, for an input signal $\theta$ ranging in angle from 0° to 90° each least significant bit of signal I corresponds to .0879 degrees.

The binary signal from counter 18, carried on connections $X_1$ through $X_{10}$, is connected to a read-only-memory 19 of a type generally well known in the art where the binary signal selects the location or address and the content thereof is read out as a signal $\Delta F(X)$. Accordingly, as counter 18 is sequentially rippled through a count, values of $\Delta F(X)$ are serially read out of memory 19. Each value of $\Delta F(X)$ represents in binary code a difference increment in a sine $\theta$ function corresponding to the respective increments in $\theta$. For a continuous function, such as a sine $\theta$ function, the variations in adjacent $\Delta F(X)$ signals are never greater than one least significant bit, thus the variations of the $\Delta F(X)$ signal are stored on a single binary element at each location or address and means described hereinbelow are provided to generate a secondary readout correcting the $\Delta F(X)$ signal over a particular region of the sine $\theta$ function. To accommodate such a secondary readout an interval detector 12 is included receiving at the input side thereof counter 18 output signal branched off the connections $X_1$ through $X_{10}$. Interval detector 12 at the output end thereof provides a correction coefficient signal $D_n$ the value thereof depending on the signal carried on connections $X_1$ through $X_{10}$ as described hereinbelow.

Specifically a sine $\theta$ function incremented in 1,024 least significant bits breaks down into two distinct regions of $\Delta F(X)$ variation. In the first region, approximately corresponding to 0° to 50° range in $\theta$, $\Delta F(X)$ varies alternatively between two and one least significant bits for each increment in $\theta$; for angles between 50° and 90° signal $\Delta F(X)$ alternatively varies only between one and zero least significant bits. Accordingly, in this instance there are three distinct levels of a possible $\Delta F(X)$ increment, i.e., 2, 1, and 0 bits, however within any one region there are only two levels, either 2 and 1 or 1 and 0. Thus any conventional binary element, such as a switch, at each address of the memory is adequate to store or record the variations in $\Delta F(X)$ where the interval detector 12 assigns a value of 2 for a $\Delta F(X) = 0$ when $\theta$ is between 0° and 50° and a value of 0 for a 0 output between 50° and 90° and the memory is programmed accordingly.

Signal $\Delta F(X)$, varying by one least significant bit, is connected to a logic unit 15 which also is connected to receive signal $D_n$ from the interval detector 12 providing an output signal either of 2 on connector $G_2$ or 1 on connector $G_1$. The signals on $G_2$ and $G_1$ are then fed to a variable increment counter 20 which accumulates the values as described herein below. The output of the variable increment counter 20 is received, on connectors $F_1$ through $F_{10}$, by a buffer 21 and an output signal of buffer 21 is connected to an output display 22. Buffer 21, by conventional means, is enabled by a signal B from a comparator 13 which at the input side thereof receives both the output signal I of input encoder 14 and the fixed increment counter 18 signal on connectors $X_1$ through $X_{10}$. Comparator 13 registers a match, by any means known in the art, when the fixed increment counter 18 signal and the signal I are identical providing the signal B which permits buffer 21 to read out into output display 22.

Figures 2, 3:
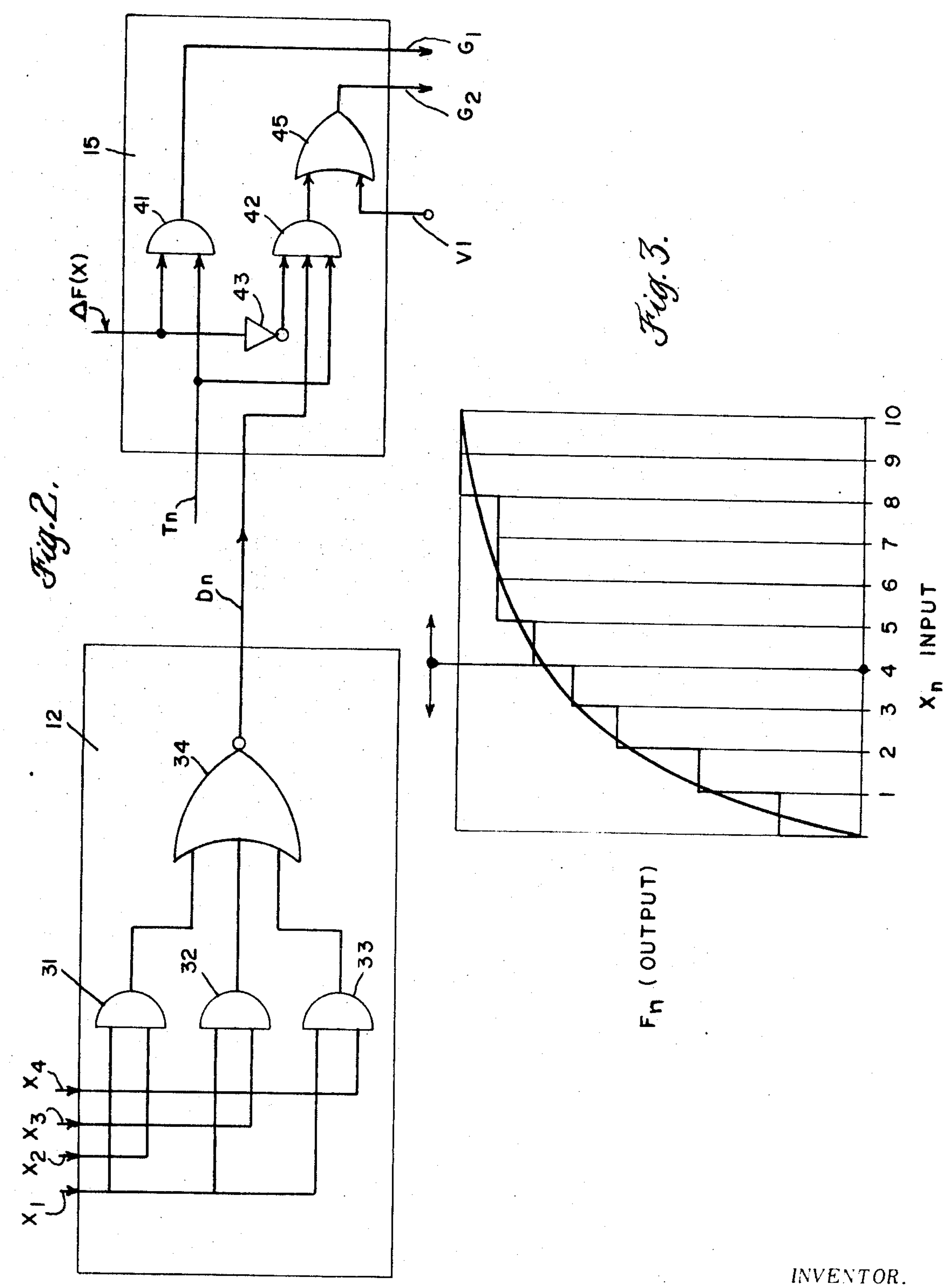
FIG. 2 is a logic diagram of an interval detector and logic unit according to the present invention.
FIG. 3 graphically illustrates a reproduction of a continuous function according to the present invention.

As shown in more detail in FIG. 2, interval detector 12 comprises three AND gates 31, 32 and 33 each respectively connected to connectors $X_1$ and $X_2$, $X_1$ and $X_3$, and $X_1$ and $X_4$, where the signal on each one of these is either 0 or 1 as described above. The output of AND gates 31, 32 and 33 are fed to a NOR gate 34 which registers the signal $D_n$ when none of the AND gates are registering. NOR gate 34 will therefore register a 1 signal as long as the fixed increment counter 18 is below the binary code value of:

$$X_1\,X_2\,X_3\,X_4\,X_5\,X_6\,X_7\,X_8\,X_9\,X_{10}$$

1 0 0 0 1 1 1 1 1 1 which corresponds approximately to all values of $\theta$ below 50.6°. Above that value either connector $X_2$, $X_3$ or $X_4$ will register a 1 and the NOR gate 34 will not register a 1 on signal $D_n$. Gate 34 output signal $D_n$ is connected to the input of an AND gate 42 in logic 15, where the gate 42 also receives the $\Delta F(X)$ signal inverted by an inverter 43. Also connected to the input of AND gate 42 is the clock 17 signal $T_n$ and gate 52 will therefore pass a clock pulse when both the inverse of $\Delta F(X)$ and the $D_n$ signal register a 1. The output signal of gate 42 is connected to an OR gate 45 which also receives a signal $V_1$ from counter 20 indicative of a completed count. OR gate 45, at the output side thereof, produces a signal $G_2$ which is connected to counter 20. Signal $\Delta F(X)$ and the timing signal $T_n$ are also connected to the input of an AND gate 41 which passes a 1 on signal $G_1$ at the output side thereof. Signal $G_1$ is also connected to counter 20. Signals $G_1$ and $G_2$, respectively, increment counter 20 by one or two bits by passing the pulses on the clock 17 signal $T_n$. Any conventional means of incrementing a counter by one least significant bit is contemplated, such as, for example, connecting signal $G_1$ to the least significant bit flip-flop of the counter. Incrementing by two bits in counter 20 can be also performed by any well known means, such as, for example, connecting signal $G_2$ to the bit flip-flop one level higher from the least significant bit.

Specifically, gate 41 is controlled by $\Delta F(X)$. If $\Delta F(X) = 1$ a signal $T_n$ timing pulse passes through. Otherwise the pulse is not passed. Thus the variable increment counter 20 is incremented by one least significant bit when $\Delta F(X) = 1$. Gate 42 is controlled by the inverse or complement of $\Delta F(X)$ and the signal $D_n$ from interval detector 12. As previously described, interval detector 12 will register a 1 on signal $D_n$ only for values less than 50.6° and alternatively a 0 when values greater than 50.7° are read in. Accordingly when the interval detector 12 registers a 1 and the $\Delta F(X)$ registers a 0 timing pulse passes through gate 42 incrementing the variable increment counter 20 by two least significant bits. Gate 41 and 42 never pass pulses at the same time specifically because gate 41 is a function of $\Delta F(X)$ and gate 42 is a function of the inverse of $\Delta F(X)$. The output of gate 42 is fed to OR gate 45 such that a two bit increment cannot pass through gate 45 when the count is complete.

The operation of the inventive digital function generator will be now described with reference to FIG. 3. Specifically, the ordinate of FIG. 3 is broken down into 10 equal increments illustratively representing the 1,024 equal increments of $\theta$ and the fixed increment counter 18 designated $X_n$, and the abscissa corresponds to the output of the variable increment counter 20 designated as $F_n$. As shown between counts 0 and 4 of the ordinate the best fit replica of the function generated by variable increment counter 20, shown as $F_n$, varies between two bit steps and one bit steps only. Over the region of $X_n = 4$ to 10 the increments vary between zero and one bit. Accordingly a sine function can be reduced to regions at which the increments vary between two and one bits and one and zero bits, never varying by more than one bit in one region. In this manner a memory having only one binary element at each address or location can be utilized in combination with the interval detector correcting the absolute level of the alternating interval size.

Some of the many advantages of the present invention should now be readily apparent. The invention provides, with a minimal addition of hardware, means by which a memory of limited size can be utilized to model or generate complex functions. Furthermore, the invention provides means by which any function increment can be accommodated in a memory having only one binary switch at each address by the simple connection to the higher order binary flip-flops of a binary counter.

Obviously many modifications and variations of the present invention are possible in the light of the above teachings. It is therefore to be understood that within the scope of the appended claims the invention may be practiced otherwise than is specifically described.

What is claimed is:

1. A digital function generator for generating a digital signal indicative of a predetermined function of an analog input signal, comprising, in combination:

encoding means for converting the input signal into a digital output signal indicative of incremental amplitudes thereof;

address means for providing a timing signal and cyclically rippled binary signals in parallel bits;

memory means for providing a timing signal and cyclically rippled binary signals in parallel bits;

memory means connected to receive the cyclically rippled binary signals in parallel bits, having programmed therein predetermined first order functions corresponding to discrete amplitudes within any group of amplitudes of said encoder means output signal for providing a first order output signal;

interval selecting means connected to receive said timing signal, a predetermined number of the binary signals from the end of each cycle, and said first order output signal, having programmed therein predetermined second order functions corresponding to discrete groups of amplitudes, for providing an output signal indicative of preselected amplitude group; and indicator means connected to receive the output signals from said interval selecting means, said address means, and said encoding means for providing an output signal indicative of predetermined combinations thereof.

2. A digital function generator for providing a predetermined function signal of a continuous input signal comprising, in combination:

encoding means for converting the input signal into a digital output signal indicative of incremental amplitudes thereof;

fixed increment counter means for cyclically producing in equal increments an output signal of increasing amplitude;

memory means connected to receive fixed increment counter means output signal, having programmed therein predetermined first order function difference increments corresponding to discrete amplitudes within any group of amplitudes of said fixed increment counter means output signal for providing a first order output signal;

group detector means operatively connected to receive said fixed increment counter means output signal, having programmed therein predetermined second order function difference increments corresponding to discrete groups of amplitudes, for providing an output signal indicative of preselected amplitude group;

logic means connected to receive the output signals of said fixed increment counter means and said memory means for providing an output signal indicative of predetermined combinations thereof;

variable increment counter means connected to receive said logic means output signal for sequentially accumulating said output signal and providing an output signal indicative of the accumulated amplitude thereof;

comparator means connected to receive the encoder means signal and said fixed increment counter means signal for providing an output signal indicative of a match therebetween; and readout means connected to receive said logic means and said variable increment counter means output signals for providing an output signal indicative of said variable counter means output signal concurrent with receiving a match signal from said comparator means.

3. A digital function generator according to claim 2, further comprising:

said memory means including a plurality of storage means each having programmed therein respective ones of said first order functions, address means connected to receive said fixed increment counter means signal for selecting corresponding ones of said storage means and providing said memory means output signal indicative of the stored contents thereof.

4. A digital function generator according to claim 3, further comprising:

said logic means including a plurality of gates each operatively connected to receive corresponding ones of said detector means output signals and said memory means signal for selectively producing function increment signals of predetermined amplitude corresponding to preselected combinations thereof.

5. A digital memory device for storing thereon a function of an input signal, comprising:

first means for converting the input signal into binary coded output signals corresponding to preselected intervals thereof;

second means operatively connected to receive the input signal for providing a set of incremental output signals indicative of the amplitudes of the input signal within the preselected intervals thereof; and third means operatively connected to receive said first and second means output signals for providing an incremental output signal indicative of the amplitude of the input signal.

6. A digital function generator for producing a predetermined digital function signal on receiving a continuous input signal, comprising, in combination:

encoder means for converting the continuous input signal into a binary coded signal;

fixed increment counter means for cyclically producing between a minimum and maximum amplitude a binary coded output signal sequentially incremented in equal least significant bits;

memory means connected to receive said fixed increment counter means output signal, having programmed therein binary coded first order function signal corresponding to discrete amplitude increments within any group of amplitudes of said encoder means output signal for providing a first order output signal;

group detector means operatively connected to receive said fixed increment counter means output signal, having programmed therein predetermined second order functions corresponding to discrete groups of amplitudes, for providing an output signal indicative of preselected amplitude groups;

logic means connected to receive the output signals from said fixed increment counter means and said memory means for providing a binary coded output signal indicative of predetermined combinations thereof;

variable increment counter means connected to receive said logic means output signal for sequentially accumulating said output signal;

comparator means connected to receive said fixed increment counter means and said encoder means output signals for providing an output signal indicative of a match therebetween; and readout means connected to receive said variable increment counter means output signal and said comparator means output signal for providing a readout signal upon receipt thereof.

* * * * *